(12) United States Patent
Buckley et al.

(10) Patent No.: US 8,854,668 B2
(45) Date of Patent: Oct. 7, 2014

(54) PROVIDING ACCESS TO IMAGES FROM ELECTRONIC AND/OR HARDCOPY PUBLICATIONS

(75) Inventors: Robert R. Buckley, Rochester, NY (US); Jean-Pierre R. M. Van de Capelle, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 143 days.

(21) Appl. No.: 13/555,283

(22) Filed: Jul. 23, 2012

(65) Prior Publication Data

US 2012/0290426 A1 Nov. 15, 2012

Related U.S. Application Data

(63) Continuation-in-part of application No. 12/719,177, filed on Mar. 8, 2010, now Pat. No. 8,368,935.

(51) Int. Cl.
G06F 15/00 (2006.01)

(52) U.S. Cl.
USPC ........................................... 358/1.15

(58) Field of Classification Search
USPC .............................. 358/1.15, 1.18
See application file for complete search history.

(56) References Cited

U.S. PATENT DOCUMENTS

| | | | |
|---|---|---|---|
| 5,568,246 | A | 10/1996 | Keller et al. |
| 2005/0075897 | A1 | 4/2005 | Mazzulo |
| 2005/0120303 | A1 | 6/2005 | Behbehani |
| 2008/0195645 | A1 | 8/2008 | Lapstun et al. |
| 2009/0171918 | A1* | 7/2009 | Manber et al. ................... 707/3 |
| 2009/0213402 | A1 | 8/2009 | Marggraff et al. |
| 2009/0278692 | A1 | 11/2009 | Alzaabi |
| 2009/0300539 | A1 | 12/2009 | Hendricks |

FOREIGN PATENT DOCUMENTS

| | | |
|---|---|---|
| GB | 341146 | 1/1931 |
| JP | 2001357463 | 12/2001 |
| JP | 2003281039 | 10/2003 |

OTHER PUBLICATIONS

Office Action Communication, U.S. Appl. No. 12/719,177, dated Jun. 7, 2012, pp. 1-13.

* cited by examiner

*Primary Examiner* — Saeid Ebrahimi Dehkordy
(74) *Attorney, Agent, or Firm* — Gibb & Riley, LLC

(57) ABSTRACT

A method, device, and system maintain a database of electronic and/or hardcopy publications within a first computerized device. The first computerized device receives from a second computerized device a request for at least one of the printable images within an electronic and/or hardcopy publication. The request has an identifier of the electronic and/or hardcopy publication and at least one page number of the electronic and/or hardcopy publication. The first computerized device transmits display information to cause the second computerized device to display one or more of the printable images appearing on the page number of the electronic and/or hardcopy publication. The first computerized device receives an image selection from the second computerized device that identifies selected images from among the printable images displayed by the second computerized device. The first computerized device provides the selected images to the second computerized device, or to a printer or print shop.

16 Claims, 5 Drawing Sheets

FIG. 5

PROVIDING ACCESS TO IMAGES FROM ELECTRONIC AND/OR HARDCOPY PUBLICATIONS

CROSS-REFERENCE TO RELATED APPLICATIONS

This application is a Continuation-In-Part of U.S. application Ser. No. 12/719,177 filed Mar. 8, 2010, the complete disclosure of which, in its entirety, is herein incorporated by reference.

BACKGROUND

Embodiments herein generally relate to computerized devices that allow access to images (pictures, photographs, drawings, graphic art work, etc.) and more particularly to a computerized device and method that allow users to access electronic versions of images by merely referencing the name of the electronic and/or hardcopy item where the images appear.

When a hardcopy book or e-book contains an image that a user would like to obtain, the user can try and track it down via the photo credits that most but not all hardcopy books or e-books have, or via the publisher. Even if the photo credits are there, a lot of sleuthing is needed to locate the desired image. Some hardcopy book or e-books give the UPI/Corbis reference numbers for the pictures so that the user can search by image number. Otherwise, the user would go through the usual keyword search, using location, date, subject and so on to locate the image the user is interested in.

SUMMARY

One method herein maintains a database of electronic and/or hardcopy publications within a first computerized device. To feed and update the database, the embodiments herein can receive the images from publishers of the electronic and/or hardcopy items or can automatically and continuously search one or more networks for electronic images that correspond to the electronic and/or hardcopy publications (e-publications, e-magazines, e-newspapers, and e-periodicals). Such electronic images and the electronic and/or hardcopy publications each have one or more printable images. The printable images are printable; however, printable image can also refer to all images available from the database, which in the end may be used on a website and not printed. Therefore, the database comprises a plurality of the printable images, and correlates the printable images to different pages of different electronic and/or hardcopy publications.

A second computerized device can be operatively connected to (directly or indirectly connected to) the first computerized device by way of, for example, wired or wireless networks (such as a local area network or a wide area network, such as the Internet). For example, the first computerized device could be a file server maintaining the database and the second computerized device could be a user's personal computer, personal digital assistant (PDA), mobile computer, cell phone, etc., that is connected to the first computerized device by way of the Internet.

According to embodiments herein, the first computerized device receives a request for at least one of the printable images within an electronic and/or hardcopy publication that is within the database from the second computerized device. The request includes an identifier of the electronic and/or hardcopy publication (e.g., the name of the electronic and/or hardcopy publication, an identifier code for the electronic and/or hardcopy publication, etc.) and can identify at least one page number of the electronic and/or hardcopy publication.

The first computerized device transmits display information to the second computerized device to cause the second computerized device to display one or more of the printable images that appear on the identified page number of the identified electronic and/or hardcopy publication. The display information can include thumbnail images, textural identifiers, prices, etc., of the printable images appearing on the page number of the electronic and/or hardcopy publication.

The first computerized device receives an image selection from the second computerized device that identifies the selected images from among the printable images displayed by the second computerized device. After appropriate authorization and/or compensation, the first computerized device provides the selected images to the second computerized device. While the second device can download the selected image, the first device can also cause the selected image to be printed and the resulting print shipped to any location designated by the second device as part of the authorization. Ordering images, either for printing on paper, coffee mugs, etc., and shipping or downloading is one of the many capabilities provided by the embodiments herein.

One example of a special purpose or general purpose device embodiment herein is a computerized device that includes a processor and a storage device storing a database. The storage device is operatively connected to the processor and the database maintains the information corresponding to the electronic and/or hardcopy publications that have the printable images. The apparatus also includes an input/output device operatively connected to the processor. The input/output device can receive the printable images from publishers of the electronic and/or hardcopy publications into the database or can search networks for such printable images.

In operation, the input/output device receives the request for at least one of the printable images within an electronic and/or hardcopy publication that is within the database from the second computerized device. Again, the request comprises an identifier of the electronic and/or hardcopy publication and at least one page number of the electronic and/or hardcopy publication. The page number can identify the image, although a unique identifier will do, such as Figure number or Plate number. The input/output device transmits display information to cause the second computerized device to display one or more of the printable images appearing on the page number of the electronic and/or hardcopy publication. The input/output device receives an image selection identifying selected images from among the printable images displayed by the second computerized device, from the second computerized device. Then, the input/output device provides the selected images to the second computerized device. Again, the second device can be a printer/copier in a print-and-ship model, or a print-and-pick-up model.

Additional embodiments herein maintain the database of electronic publications within a first computerized device. Again, the electronic publications each comprise one or more printable images. This method displays an electronic publication within the database on a second computerized device. Further, a request to purchase at least one selected image of the printable images within the electronic publication is received from a user of the second computerized device (received into the second computerized device). This request to purchase can be provided by way of drop down menu when a user clicks on the selected image, or clicking on the selected image can open a separate browser page for making the request to purchase. The request to purchase can optionally include the name of the electronic publication, an identifier code for the electronic publication, textural identifiers, and prices of the printable images. Next, this method transmits the request to purchase from the second computerized device to the first computerized device. Finally, this method provides the selected image to the user of the second computerized device once payment or other agreement has been received/made.

These and other features are described in, or are apparent from, the following detailed description.

BRIEF DESCRIPTION OF THE DRAWINGS

Various exemplary embodiments of the systems and methods are described in detail below, with reference to the attached drawing figures, in which:

FIG. 5 is a screenshot according to embodiments herein.

DETAILED DESCRIPTION

Figure 1:
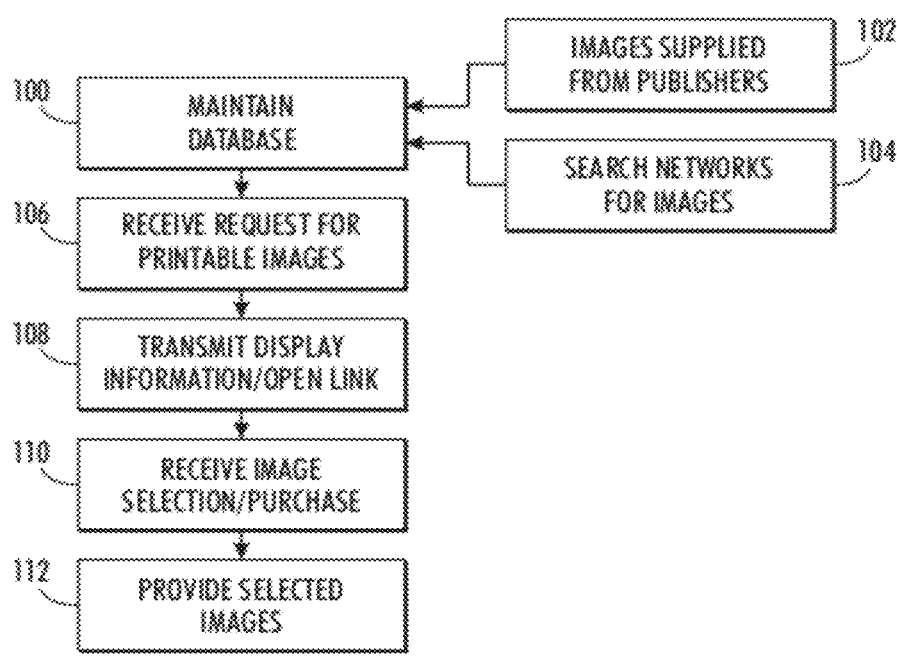
FIG. 1 is a flow diagram illustrating embodiments herein.

With the embodiments herein a publisher can register a hardcopy book or e-book (having pictures) with a service that offers a dedicated website where people can go and find the image using the ISBN number (or hardcopy book or e-book title) and page number. Once found, the website either offers terms for obtain the image, or a link to the image owner's website (which will offer terms for image use). The user can, for example, purchase a framed electronic and/or hardcopy of the image or obtain rights to the digital version of the image.

People are used to searching for images via keywords, either on the entire web or on websites such as that of the Library of Congress or Corbis. However, one largely unexploited source of images is hardcopy book or e-books, which when they contain images, have a collection of photos, organized by subject or topic and selected and filtered by the author or photo editor for content and relevance. Buying or borrowing a hardcopy book or e-book indicates that a user is already interested in the content and the images it contains, so the publisher has self-selected prospects for secondary sales based on the hardcopy book or e-book content, in this case, images. The embodiments herein turn an ordinary hardcopy book or e-book into a means of marketing images and a new sales channel for image content.

A hardcopy book or e-book that offers the service of the embodiments herein can indicate the availability of the service by displaying an appropriate logo or trademark and including an identification of the website where the service can be activated on some prominent portion of the electronic and/or hardcopy publication (e.g., on the back cover and/or title page). The welcome page on the website is very simple: the user enters the ISBN or title of the hardcopy book or e-book that indicated it subscribed to the service. The user can also enter the page number, or be taken to a webpage with the numbers of the pages for which images in that hardcopy book or e-book are available. Since there may be more than one image on a page, pages with multiple images may show the thumbnails of the images. An order form is linked to the page number or a thumbnail image. This can be an order form on an existing site for image ordering, or an order form offered by the service described herein. Further links can be made to printing services for fulfillment of the order.

As mentioned above, it is often difficult to locate the source of an image (photograph, picture, graphic art, chart, drawing, figure, etc.) that the user finds within an electronic and/or hardcopy publication such as a hardcopy book or e-book (an electronic book that can be read using an electronic reader), an e-periodical (an electronic periodical that can be read by an electronic reader), an e-magazine (an electronic magazine that can be read by an electronic reader), or an e-newspaper (an electronic newspaper that can be read by an electronic reader), etc. In order to address such a situation, the embodiments herein provide computerized devices and methods that allow users to access electronic versions of images by merely referencing the name and page number of the electronic and/or hardcopy item where the images appear.

As shown in flowchart form in FIG. 1, one exemplary method herein maintains a database of electronic and/or hardcopy publications within a first computerized device (in item 100). To create, feed, and update the database, the embodiments herein can receive the images from publishers of the electronic and/or hardcopy items (as shown in item 102) or can automatically and continuously search one or more networks for electronic images that correspond to the electronic and/or hardcopy publications as shown in item 104 using existing web crawlers or proprietary searching software that searches, for example, networks such as the internet. Such electronic and/or hardcopy publications each have one or more printable images that are maintained within the database. Therefore, the database comprises a plurality of the printable images, and correlating data that correlates the printable images to different pages of different electronic and/or hardcopy publications.

For example, publishers who maintain the various image files that are utilized within the hardcopy or electronic books, magazines, periodicals, and other electronic and/or hardcopy items that they publish, can supply such images to the database. In some embodiments, the database can be maintained by an independent service provider, and the publishers are provided the opportunity of subscribing to the service of the service provider. In other words, the publishers can maintain an account with the service provider to allow purchasers of the electronic and/or hardcopy items to enjoy an increased level of utilization of the images within the electronic and/or hardcopy items.

A second computerized device can be operatively connected to (directly or indirectly connected to) the first computerized device by way of, for example, wired or wireless networks (such as a local area network or a wide area network, such as the Internet). For example, the first computerized device could be a file server maintaining the database and the second computerized device could be a user's personal computer, personal digital assistant (PDA), mobile computer, cell phone, etc., that is connected to the first computerized device by way of the Internet.

As shown in item 106 in FIG. 1, the first computerized device receives a request for at least one of the printable images within an electronic and/or hardcopy publication that is within the database from the second computerized device. The request includes an identifier of the electronic and/or hardcopy publication (e.g., name or partial name of the electronic and/or hardcopy publication, author of the application, an identifier code (ISBN) for the electronic and/or hardcopy publication, etc.) and can include at least one page number of the electronic and/or hardcopy publication, a picture number within the electronic and/or hardcopy publication, etc.

The embodiments herein are quite flexible and user friendly. For example, if the user remembers that a certain picture was in a hardcopy book or e-book they recently viewed, but the user cannot remember the exact title of the hardcopy book or e-book, they can enter the name (or partial name) of the author and, in response, the embodiments herein will display all hardcopy book or e-books by that author that contain one or more images (and are within the database). Similarly, the user can enter a partial name of the hardcopy book or e-book (and potentially the author's name (or partial author name)) and a listing of all hardcopy book or e-book titles containing the entered words (and or partial author name) that are maintained by the database will be displayed. If a user does not specify a page number or picture number within a specific hardcopy book or e-book, all available images can be provided in the display to allow the user to select from such images.

In response to the request in item 106, the first computerized device transmits display information to the second computerized device in item 108. This "display information" causes the second computerized device to display one or more of the purchase options for the printable images to the user. Therefore, the display information is utilized by the second computerized device to provide the user with a screen of information of the various images that appear on the identified page number of the identified electronic and/or hardcopy publication and that are maintained within the database.

The user can simply enter the title (or partial title) of the hardcopy book or e-book or also enter the page number, or be taken to a webpage with the numbers of the pages for which images in that hardcopy book or e-book are available. Since there may be more than one image on a page, pages with multiple images may show the thumbnails of the images.

In additional embodiments herein the methods can display the electronic publication (maintained within a database on a first computerized 100) on a second computerized device (such as the user's device 314, shown in FIG. 3, discussed below). Further, a request to purchase at least one selected image of the printable images within the electronic publication is received from a user of the second computerized device (received into the second computerized device 106).

Figure 4:
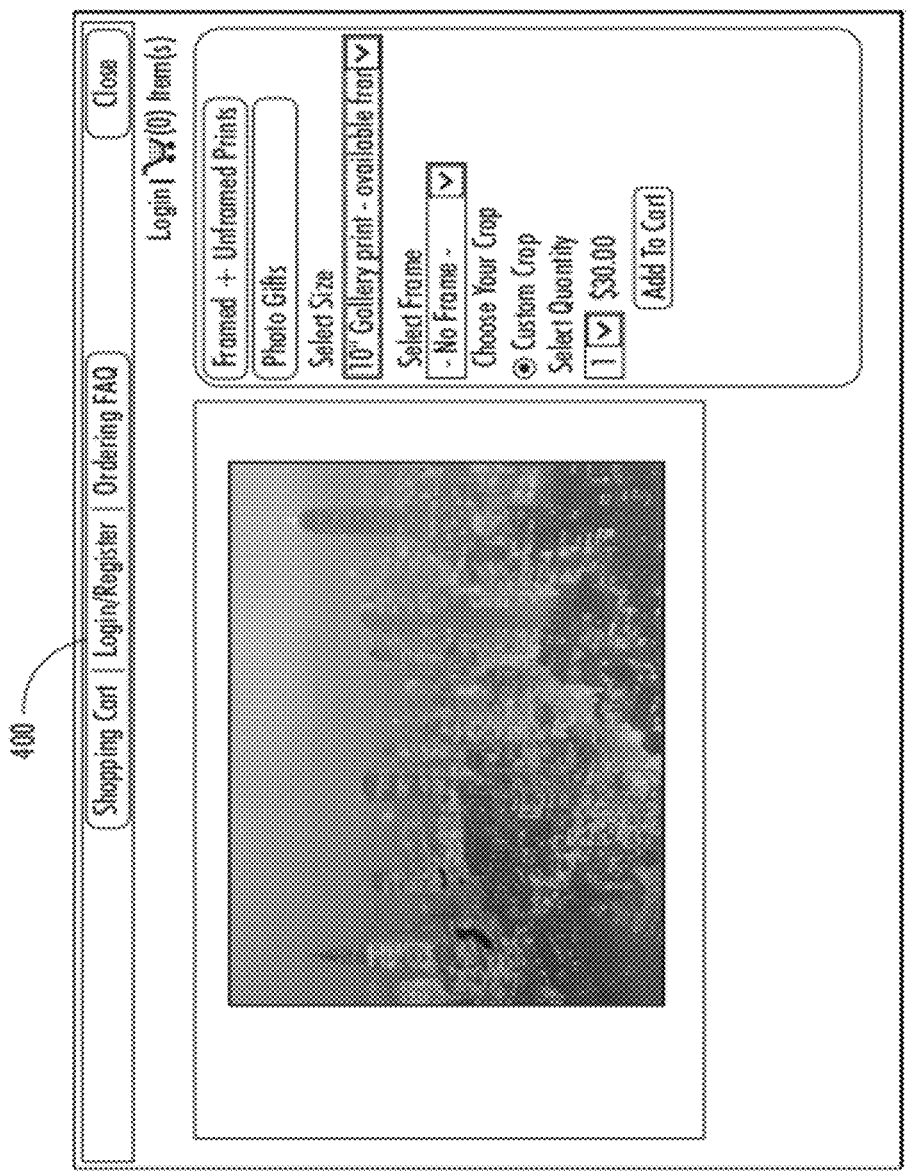
FIG. 4 is a screenshot according to embodiments herein.
Figure 5:
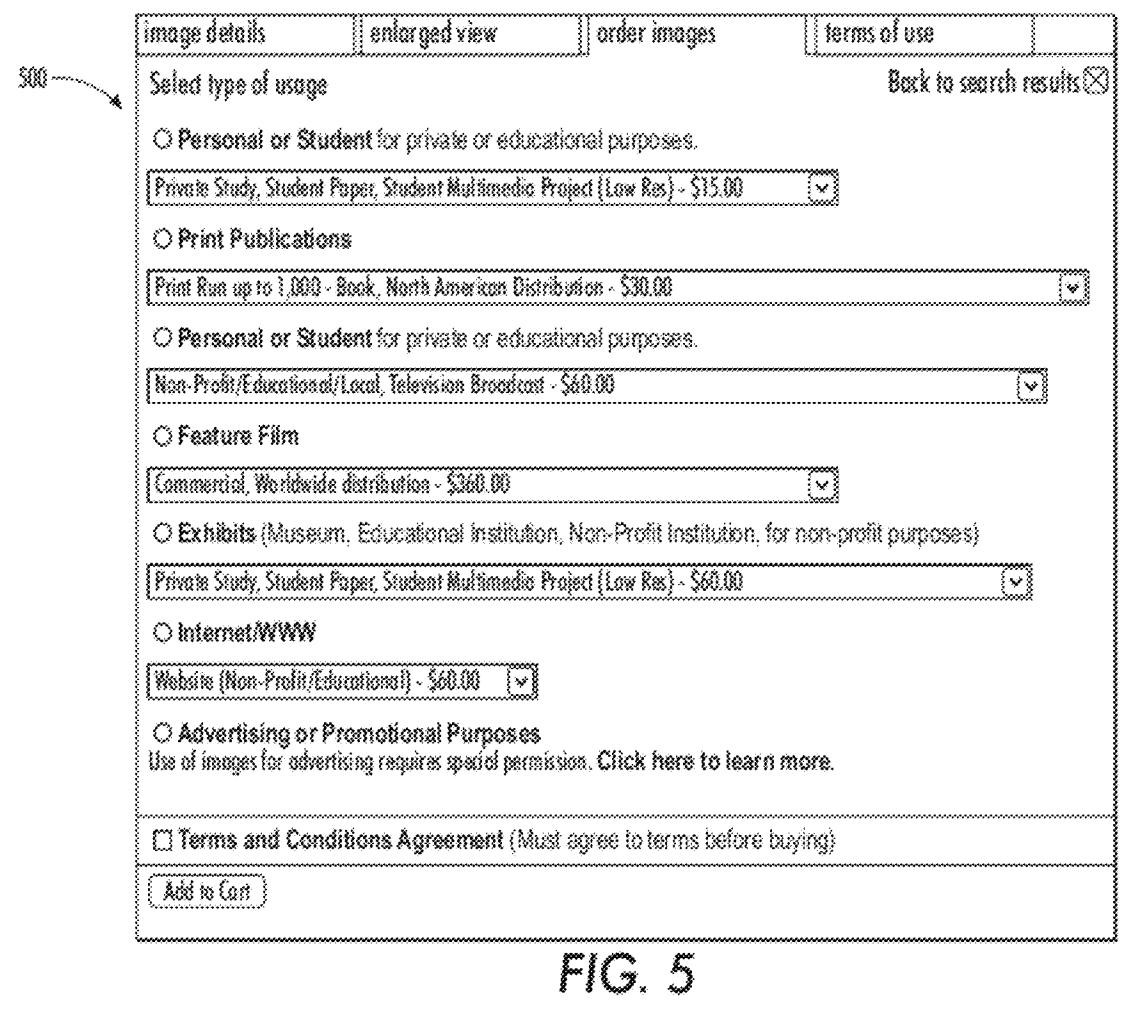

This request to purchase 106 can be provided by way of a link or drop down menu that appears on the user's computerized device when a user clicks or taps on the selected image when using the user interface of second computerized device, or clicking/tapping on the selected image can open a separate browser page (108) for making the request to purchase (using displays such as those shown in FIGS. 4 and 5, discussed below).

The link/menu can take the user to a number of different places 108, depending on the level of support for this functionality in the e-book, including: directly to a web site where the rights or hard copy can be purchased from the owner of the picture or from an agent that is authorized by the owner to sell rights or hard copy output of the picture; to a web site which allows the user to enter the e-books reference number which will then lead to a site which contains the pictures used in this book, and usage rights or hard copy can be purchased by the user; to an application running on the e-book reader which allows purchasing the rights or hard copy output of the picture in the book; etc.

The request to purchase 110 can optionally include the name of the electronic publication, an identifier code for the electronic publication, textural identifiers, and prices of the printable images (which can be automatically supplied by the second computerized device, with the user merely having to acknowledge or approve of such information). Therefore, simply by clicking/tapping on an image in an electronic publication 106, a user can be presented with a purchase/authorization release form for the selected image 108, having all necessary information regarding the selected image automatically supplied on the form by the method and systems herein. The user merely needs to select the specific size or rights that are desired to be obtained in the selected image, and provide delivery information, payment information (if required), etc. (most of which could also be automatically supplied).

Next, this method transmits the request to purchase from the second computerized device to the first computerized device 110. Finally, this method provides the selected image to the user of the second computerized device once payment or other agreement has been received/made 112.

Figure 2:
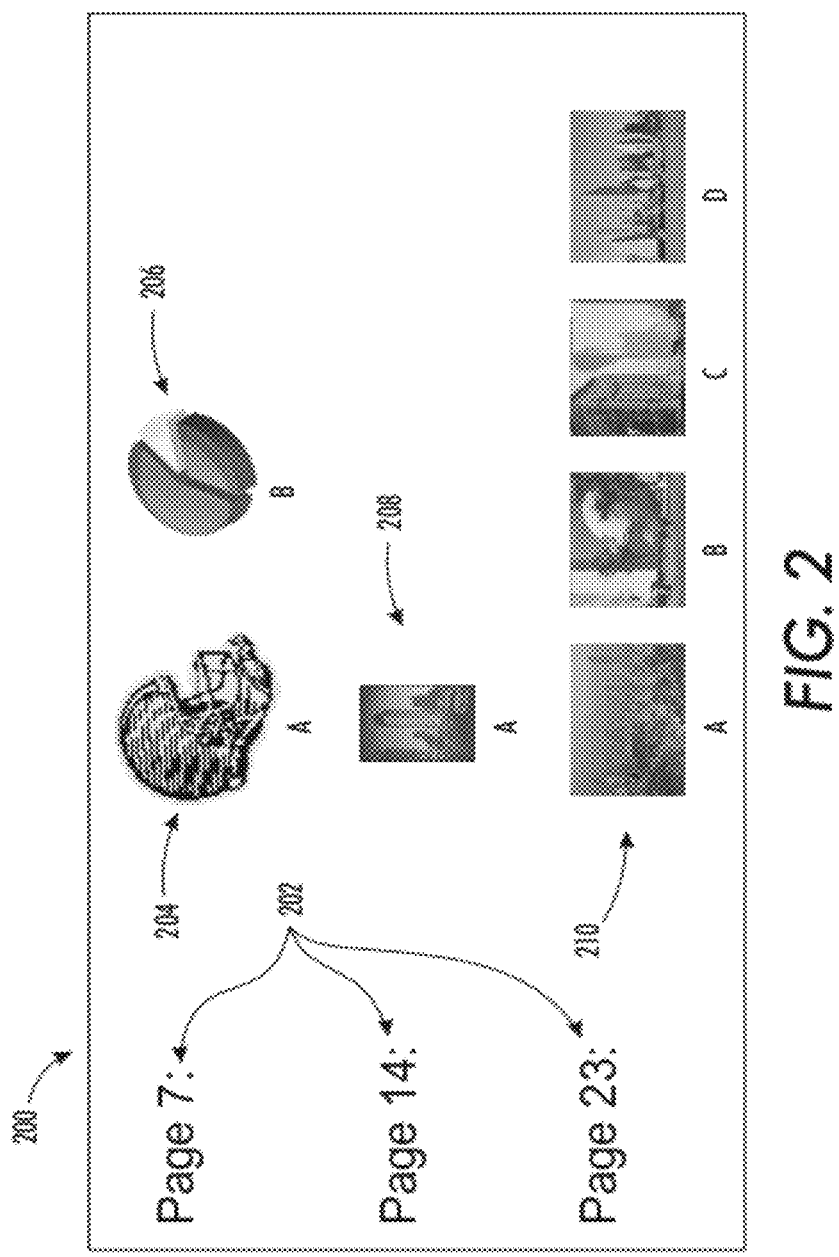
FIG. 2 is a screenshot according to embodiments herein.

As mentioned above, the display information can include thumbnail images, textural identifiers, prices, etc., of the printable images appearing on the page number of the electronic and/or hardcopy publication from which the user can make a selection. FIG. 2 illustrates an exemplary screen shot of such display information.

More specifically FIG. 2 illustrates a screenshot 200 that can be displayed on, for example, the second computerized device when the user clicks on one or more of the images. Again, the screen shot 200 can be based on the display information transmitted in item 108. The screen shot 200 contains a listing of the page numbers 202 and thumbnail images (204, 206, 208, 210) potentially representing all the images that appear on the corresponding page numbers within the electronic and/or hardcopy publication identified in item 106. For example, on page 7 of the electronic and/or hardcopy publication identified in item 106, the drawing of a helmet 204 and a pie chart 206 appear. On page 14 of the electronic and/or hardcopy publication identified in item 106, a color photograph 208 appears and, similarly, on page 23, various black and white photographs 210 appear.

The user of the second computerized device can then make selections from the screenshot 200 shown in FIG. 2. For example, the user can position the cursor over the appropriate thumbnail image and push an appropriate button to identify that image as being selected. Alternatively, the user can identify the image by referring to the page number and one of the underlying letter codes (A-D) appearing below the thumbnail images in the screenshot 200.

The screenshot 200 illustrated in FIG. 2 only illustrates one example of how the embodiments herein could display the various choices to the user of the second computerized device and those ordinarily skilled in the art would understand that many different forms of display could be utilized with embodiments herein and the embodiments herein are intended to include all such uses.

Thus, an order form can be linked to the page number or a thumbnail image in the display. These links can be to an order form on an existing site for image ordering, or an order form offered by the service described herein. Further, links can be made to printing services for order fulfillment. Such additional displays could provide fields for the user to include their preferences for receiving the image (printed form, electronic and/or hardcopy form, etc.); and provide fields for shipping information, payment information, subscription information, etc. FIGS. 4 and 5 illustrate exemplary screen shots 400, 500 that could be utilized for ordering information.

Thus, once the user makes the appropriate selection of one or more of the thumbnail images appearing in the screen shot 200, the first computerized device receives an image selection from the second computerized device that identifies the selected images from among the printable images displayed by the second computerized device (item 110). After appropriate authorization and/or compensation, the first computerized device provides the selected images to the second computerized device or some other device/location, such as a printer or print shop (in item 112). Again, in item 112 the image could be provided to the second computerized device or printing device in electronic and/or hardcopy form over one or more networks, or could be provided in printed form and shipped to an address supplied by the user of the second computerized device.

Figure 3:
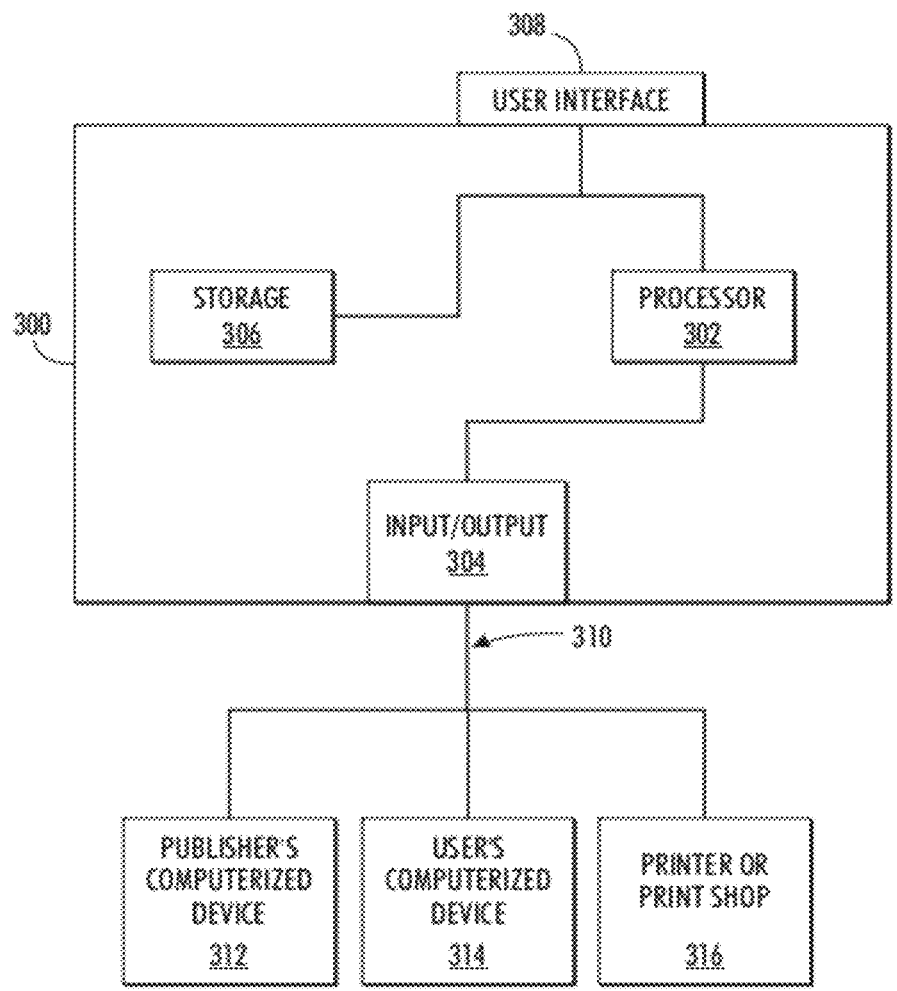
FIG. 3 is a schematic diagram of a device/system according to embodiments herein.

FIG. 3 illustrates one example of a special purpose or general purpose first computerized device 300 that includes a processor 302 and a non-transitory storage device 306 storing the database mentioned above. The storage device 306 is operatively connected to the processor 302 and the database maintains the information corresponding to the electronic and/or hardcopy publications that have the printable images. Further, the storage device 306 comprises a computer readable medium (magnetic, optical, capacitor-based, etc.) that contains instructions (potentially in the form of a software program) that cause the processor 302 to perform the various methods that are described herein.

The apparatus also includes a user interface 308 (screen, keyboard, cursor device, etc.) an input/output device 304 (wired, wireless, etc.) operatively connected to the processor 302. The input/output device 304 connects to various wired or wireless networks 310 which can comprise local area networks and wide area networks (such as the Internet).

As described above, the input/output device 304 can receive the printable images from publishers 312 of the electronic and/or hardcopy publications into the database or can search the networks 310 for such printable images. Therefore, for example, the first computerized device 300 could utilize the input/output device 304 to continually search various networks 310 for publishers who have computerized devices (312) connected to the networks, and who offer electronic and/or hardcopy works that contain images. Upon locating such a publisher, the first computerized device 300 can automatically contact the publisher and offer them the service of maintaining their images within the database stored in the storage 306. This network searching process increases the diversity of publications that are included within the database and also benefits the publisher by making their hard copy works more attractive to potential purchasers. Further, if the users are charged to receive the images from the database, a portion of such funds can potentially be shared with publishers, thereby providing publishers additional revenue benefits.

In operation, the input/output device 304 receives the request for at least one of the printable images within an electronic and/or hardcopy publication that is within the database from a second computerized device, such as a user's computerized device 314. Again, the request comprises an identifier of the electronic and/or hardcopy publication and at least one page number of the electronic and/or hardcopy publication.

The input/output device 304 transmits display information to cause the second computerized device 314 to display one or more of the printable images appearing on the page number of the electronic and/or hardcopy publication. The input/output device 304 receives an image selection identifying selected images from among the printable images displayed by the second computerized device 314, from the second computerized device 314. Then, the input/output device 304 provides the selected images to the second computerized device 314, to a printer/print shop 316, etc.

Thus, the embodiments herein provide a method for connecting a hardcopy publication or e-publications with images and sites that offer images for sale or licensing. If there is not an existing licensing site for an image, then one can be created on the website utilized by embodiments herein offering terms selected from a menu of options, e.g. prints only available, image licenses available, etc.

With the embodiments herein the user uniquely selects a hardcopy publication or e-publication and uniquely selects an image in the selected hardcopy publication or e-publication with reference to the page, plate or, figure number. The embodiments herein offer one or more options with terms for purchasing the selected image in the selected hardcopy publication or e-publication and provide a way to complete the purchase and way for fulfillment of the order.

With embodiments herein the publishers can pay a fee to have their hardcopy publication or e-publications listed, plus a click charge based on orders or even visits. Advertisements can be offered on the page or order webpage. And those who do the fulfillment can pay a click charge on orders placed through them. The embodiments herein can be used for hardcopy publications, online publications, and photo essays, as well as any curated or edited collection of images. Also, the embodiments herein can be made an option offered during the self-publishing process. Further, with online publications the embodiments herein can link the fulfillment site directly to the image online.

Thus, as shown above, it is not easy for a user to obtain usage right for a standalone picture, for instance at a higher resolution, or obtain a hard copy print or framed picture from the images used in an e-publication. The systems and methods herein describe a business model where an e-publication format will enable users to purchase higher resolution, standalone versions of images used in the e-publication. The e-publication can contain a link to a web-site, for instance the publisher's web-site, a more generic portal or the web site of the owner of the picture. The link can either be invoked by pointing to the image, or in some other place in the publication.

As shown above in FIGS. 4 and 5, on the portal the user then has the ability to purchase usage rights to images in the book, or purchase hard copy output of images in the book. With such, the user immediately gets access to a particular picture or to all pictures in the book An e-book or other e-publication that offers the methods described herein can indicate so by displaying an appropriate actionable hot link somewhere in the book, or a hot link in some way connected to the user taking an action on the image in the book (hover over, right click, click, etc.). The link can take the user to a number of different places, depending on the level of support for this functionality in the e-book, including: directly to a web site where the rights or hard copy can be purchased from the owner of the picture or from an agent that is authorized by the owner to sell rights or hard copy output of the picture; to a web site which allows the user to enter the e-books reference number which will then lead to a site which contains the pictures used in this book, and usage rights or hard copy can be purchased by the user; to an application running on the e-book reader which allows purchasing the rights or hard copy output of the picture in the book; etc. This is something not possible with a hardcopy book, which requires a user to go to a website, enter an identifier, get back some choices and make a selection and identify the selection. With the e-book or electronic publication, clicking on the image in the e-book takes the user directly to the website and identifies the selected image avoiding all intermediate steps needed in hardcopy publications.

Thus, many modern computerized devices, including personal computers, laptop computers, notebook computers, tablet computers, smartphones, etc., have ever increasing abilities to display and interact with electronic versions of traditional books, magazines, newspapers, periodicals, brochures, etc. While users may be able to (legally or illegally) download and save images within such electronic publications, such users may still desire to purchase the rights to use such images in other publications, purchase higher resolution copies of such images, purchase printed versions of such images, etc. The systems and methods herein provide a seamless and user-friendly way to allow users to make such purchases and obtain legitimate permissions to use such images, because with just a few simple input actions described above, a user can obtain additional rights to a specific image (without having to search and identify the image owner).

The systems and methods herein substantially reduce on-line piracy by giving users an easy and quick way to comply with various copyright laws and intellectual property rights. The vast majority of computer users want to respect intellectual property rights, but find the path to complying with various rules and regulations littered with hurdles of finding the legitimate image owner, evaluating a way to negotiate for intellectual property rights, preparing appropriate agreements, finding a fair price, etc. The systems and methods herein remove such hurdles by providing a simplified interface that very simply allows the user to initiate an image purchase from links within the electronic publication itself, or by simply entering the name of the publication. In doing so, the systems and methods herein decrease on-line piracy, increase user satisfaction, increase revenue to image owners, etc., and thereby provide substantial benefits to all parties involved.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic and/or electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, hardcopy book or e-bookmaking machine, facsimile machine, multi-function machine, etc., which performs a print outputting function for any purpose. The details of printers, printing engines, etc., are well-known by those ordinarily skilled in the art and are discussed in, for example, U.S. Pat. No. 5,568,246, the complete disclosure of which is fully incorporated herein by reference. The embodiments herein can encompass embodiments that print in color, monochrome, or handle color or monochrome image data. All foregoing embodiments are specifically applicable to electrostatographic and/or xerographic machines and/or processes.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof. Unless specifically defined in a specific claim itself, steps or components of the embodiments herein cannot be implied or imported from any above example as limitations to any particular order, number, position, size, shape, angle, color, or material.

What is claimed is:

1. A method comprising:
   maintaining a database of electronic publications within a first computerized device, said electronic publications each comprising one or more printable images;
   displaying, on a second computerized device, an electronic publication within said database;
   receiving, into said second computerized device, a request for at least one of said printable images within said electronic publication, said request comprising an identifier of said electronic publication and at least one page number of said electronic publication or an identifier code for said printable images, said identifier of said electronic publication comprising a name of said electronic publication or an identifier code for said electronic publication;
   locating printable images appearing on said page number of said electronic publication and prices of said printable images based only on: said identifier of said electronic publication and said page number of said electronic publication; or said identifier code for said printable images, said printable images consisting of pictures, photographs, drawings, and graphic art;
   displaying, on said second computerized device, one or more of said printable images appearing on said page number of said electronic publication or corresponding to said identifier code for said printable images, and said prices of said printable images;
   receiving, into said second computerized device, an image selection identifying selected images from among said printable images displayed by said second computerized device; and
   providing, said selected image to a user of said second computerized device.

2. The method according to claim 1, further comprising receiving, by said first computerized device, said printable images from publishers of said electronic publications into said database.

3. The method according to claim 1, said database comprising a plurality of said printable images and correlating data that correlates said printable images to different pages of different electronic publications, or to an identifier code for said printable images.

4. The method according to claim 1, said displaying, on said second computerized device, one or more of said printable images comprising displaying textural identifiers of said selected image.

5. A method comprising:
   searching at least one network for electronic publications that correspond to printed publications, said electronic publications and said printed publications each comprising one or more printable images;
   maintaining a database of said electronic publications within said a first computerized device;
   displaying, on a second computerized device, an electronic publication within said database;
   receiving, into said second computerized device, a request for at least one of said printable images within said electronic publication, said request comprising an identifier of said electronic publication and at least one page number of said electronic publication or an identifier code for said printable images, said identifier of said electronic publication comprising a name of said electronic publication or an identifier code for said electronic publication;

locating printable images appearing on said page number of said electronic publication and prices of said printable images based only on: said identifier of said electronic publication and said page number of said electronic publication; or said identifier code for said printable images, said printable images consisting of pictures, photographs, drawings, and graphic art;

displaying, on said second computerized device, one or more of said printable images appearing on said page number of said electronic publication or corresponding to said identifier code for said printable images, and said prices of said printable images;

receiving, into said second computerized device, an image selection identifying selected images from among said printable images displayed by said second computerized device; and providing, said selected image to a user of said second computerized device.

6. The method according to claim 5, further comprising receiving, by said first computerized device, said printable images from publishers of said electronic publications into said database.

7. The method according to claim 5, said database comprising a plurality of said printable images and correlating data that correlates said printable images to different pages of different electronic publications.

8. The method according to claim 5, said displaying, on said second computerized device, one or more of said printable images comprising displaying textural identifiers of said selected image.

9. A computerized device comprising:
a processor;
a storage device operatively connected to said processor, said storage device storing a database, said database maintaining information corresponding to electronic publications, said electronic publications each comprising one or more printable images; and
an input/output device operatively connected to said processor,
said input/output device receiving from a second computerized device, a request for at least one of said printable images within an electronic publication within said database,
said request comprising an identifier of said electronic publication and at least one page number of said electronic publication or an identifier code for said printable images,
said identifier of said electronic publication comprising a name of said electronic publication or an identifier code for said electronic publication,
said processor locating printable images appearing on said page number of said electronic publication and prices of said printable images based only on: said identifier of said electronic publication and said page number of said electronic publication; or said identifier code for said printable images, said printable images consisting of pictures, photographs, drawings, and graphic art,
said input/output device transmitting display information to cause said second computerized device to display one or more of said printable images appearing on said page number of said electronic publication or corresponding to said identifier code for said printable images, and said prices of said printable images, said input/output device receiving, from said second computerized device, an image selection identifying selected images from among said printable images displayed by said second computerized device; and said input/output device providing said selected images to a user of said second computerized device.

10. The computerized device according to claim 9, said input/output device receiving said printable images from publishers of said electronic publications into said database.

11. The computerized device according to claim 9, said database comprising a plurality of said printable images and correlating data that correlates said printable images to different pages of different electronic publications.

12. The computerized device according to claim 9, said display information comprising at least one of thumbnail images and textural identifiers of said printable images appearing on said page number of said electronic publication.

13. A non-transitory computer-readable storage medium tangibly embodying instructions executable by a computer, said instructions causing said computer to perform a method comprising:

maintaining a database of electronic publications within a first computerized device, said electronic publications each comprising one or more printable images;

displaying, on a second computerized device, an electronic publication within said database;

receiving, into said second computerized device, a request for at least one of said printable images within said electronic publication, said request comprising an identifier of said electronic publication and at least one page number of said electronic publication or an identifier code for said printable images, said identifier of said electronic publication comprising a name of said electronic publication or an identifier code for said electronic publication;

locating printable images appearing on said page number of said electronic publication and prices of said printable images based only on: said identifier of said electronic publication and said page number of said electronic publication; or said identifier code for said printable images, said printable images consisting of pictures, photographs, drawings, and graphic art;

displaying, on said second computerized device, one or more of said printable images appearing on said page number of said electronic publication or corresponding to said identifier code for said printable images, and said prices of said printable images;

receiving, into said second computerized device, an image selection identifying selected images from among said printable images displayed by said second computerized device; and providing, said selected image to a user of said second computerized device.

14. The non-transitory computer-readable storage medium according to claim 13, said method further comprising receiving, by said first computerized device, said printable images from publishers of said electronic publications into said database.

15. The non-transitory computer-readable storage medium according to claim 13, said database comprising a plurality of said printable images and correlating data that correlates said printable images to different pages of different electronic publications, or to an identifier code for said printable images.

16. The non-transitory computer-readable storage medium according to claim 13, said displaying, on said second computerized device, one or more of said printable images comprising displaying textural identifiers of said selected image.

* * * * *